United States Patent
Yang et al.

(10) Patent No.: US 9,207,469 B2
(45) Date of Patent: Dec. 8, 2015

(54) ATHERMAL OPTICAL MODULATOR AND METHOD OF MANUFACTURING THE SAME

(71) Applicant: Samsung Electronics Co., Ltd., Suwon-Si, Gyeonggi-Do (KR)

(72) Inventors: Moon-seung Yang, Hwaseong-si (KR); Seong-ho Cho, Gwacheon-si (KR); Mohammad Rakib Uddin, Daejeon (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 190 days.

(21) Appl. No.: 13/973,521

(22) Filed: Aug. 22, 2013

(65) Prior Publication Data

US 2014/0307300 A1 Oct. 16, 2014

(30) Foreign Application Priority Data

Apr. 11, 2013 (KR) .................. 10-2013-0040028

(51) Int. Cl.
G02F 1/035 (2006.01)
G02F 1/025 (2006.01)

(52) U.S. Cl.
CPC ............ *G02F 1/025* (2013.01); *G02F 2203/60* (2013.01); *Y02E 10/50* (2013.01)

(58) Field of Classification Search
CPC ................. G02F 1/025; G02F 2203/60; H01L 31/02363
See application file for complete search history.

(56) References Cited

U.S. PATENT DOCUMENTS

| 6,647,185 | B2 | 11/2003 | Hajjar et al. |
| 7,251,408 | B1* | 7/2007 | Gunn et al. ................... 385/132 |
| 7,751,654 | B2* | 7/2010 | Lipson et al. ..................... 385/1 |
| 8,149,492 | B2 | 4/2012 | Ghidini et al. |
| 8,160,404 | B2 | 4/2012 | Pan et al. |
| 8,488,917 | B2* | 7/2013 | Manipatruni et al. ............. 385/2 |
| 8,660,387 | B2* | 2/2014 | Suzuki et al. ..................... 385/2 |
| 2006/0215949 | A1* | 9/2006 | Lipson et al. ..................... 385/2 |
| 2009/0022445 | A1 | 1/2009 | Hochberg et al. |
| 2009/0263078 | A1* | 10/2009 | Hosomi et al. .................. 385/14 |

(Continued)

FOREIGN PATENT DOCUMENTS

JP  2008-165241 A  7/2008
KR  1020010089368 A  10/2001

OTHER PUBLICATIONS

Raghunathan, V. et al. "Athermal Operation of Silicon Waveguides: Spectral, Second Order and Footprint Dependencies"; Opt. Express 18, p. 1763-17639; 2010.

(Continued)

*Primary Examiner* — Rhonda Peace
(74) *Attorney, Agent, or Firm* — Harness, Dickey & Pierce, P.L.C.

(57) ABSTRACT

An athermal optical modulator includes a waveguide, a ring resonator configured to receive light input from the waveguide and output modulated light to the waveguide, the ring resonator including a ridge unit located at a center of the ring resonator in a vertical section, a first contact connected to one side of the ridge unit and a second contact connected to the other side of the ridge unit, the first contact and the second contact forming paths for applying electricity to the ring resonator to form an electric field in the ring resonator, and a polymer layer covering the ridge unit.

16 Claims, 4 Drawing Sheets

(56) References Cited

U.S. PATENT DOCUMENTS

| | | | |
|---|---|---|---|
| 2011/0293216 A1* | 12/2011 | Lipson et al. | 385/14 |
| 2012/0189239 A1* | 7/2012 | Tu et al. | 385/2 |
| 2012/0243828 A1* | 9/2012 | Suzuki | 385/32 |
| 2013/0251300 A1* | 9/2013 | Suzuki et al. | 385/2 |
| 2014/0307300 A1* | 10/2014 | Yang et al. | 359/245 |

OTHER PUBLICATIONS

Teng, J. et al. "Athermal Silicon-on-insulator ring resonators by overlaying a polymer cladding on narrowed waveguides"; Optics Express, vol. 17, No. 17; Aug. 2009.

Han X. et al. "Design of athermal all-polymer waveguide microring resonator"; OSA/ACP; 2009.

* cited by examiner

ATHERMAL OPTICAL MODULATOR AND METHOD OF MANUFACTURING THE SAME

CROSS-REFERENCE TO RELATED APPLICATIONS

This application claims the benefit of Korean Patent Application No. 10-2013-0040028, filed on Apr. 11, 2013, in the Korean Intellectual Property Office, the disclosure of which is incorporated herein in its entirety by reference.

BACKGROUND

1. Field

Example embodiments relate to athermal optical modulators and methods of manufacturing the same, and more particularly, to optical modulators that have a relatively small change in emitted wavelength with respect to temperature change and methods of manufacturing the same.

2. Description of the Related Art

An opto-photonic device uses an optical device for transmitting signals and uses electricity for inputting and outputting the signals. An optical modulator used in an opto-photonic device is manufactured by using mainly a semiconductor substrate, and a device that transmits optical signals may be formed of Si that is formed in a process compatible with a complementary metal-oxide-semiconductor (CMOS) process.

Optical modulators based on a silicon substrate include a mach-zehnder type modulator and a ring resonator type modulator. The ring resonator type modulator has a smaller size when compared with the mach-zehnder type modulator, is operated at a higher speed and has lower power consumption.

However, the optical modulator that includes Si has a problem of changing refractive index as temperature increases. Accordingly, due to the relatively high thermo-optic coefficient of Si, a propagation wavelength is changed, and as a result, a desired optical signal may not be transmitted. For example, an optical modulator formed of a silicon substrate may have a wavelength variation with respect to temperature of 0.11 nm/K.

SUMMARY

Example embodiments provide athermal optical modulators that have a minimum wavelength change according to temperature change and may be manufactured in a process compatible with a CMOS process, and methods of manufacturing the same.

Additional aspects will be set forth in part in the description which follows and, in part, will be apparent from the description, or may be learned by practice of example embodiments.

According to example embodiments, an athermal optical modulator includes a waveguide, a ring resonator configured to receive light input from the waveguide and output modulated light to the waveguide, the ring resonator including a ridge unit located at a center of the ring resonator in a vertical section, a first contact connected to one side of the ridge unit and a second contact connected to the other side of the ridge unit, the first contact and the second contact forming paths for applying electricity to the ring resonator to form an electric field in the ring resonator, and a polymer layer covering the ridge unit.

The ring resonator may include doping regions sequentially stacked on an insulating layer, the doping regions including a p+ doping region doped with a higher concentration of p type impurity, a p doping region doped with a lower concentration of p type impurity, an n doping region doped with a lower concentration of n type impurity, and an n+ doping region doped with a high concentration of n type impurity.

The first contact may be connected to the p+ doping region, and the second contact may be connected to the n+ doping region. A protection layer may cover the ring resonator on the insulating layer, the first contact and the second contact may fill vias in the protection layer that expose the p+ doping region and the n+ doping region, and the first contact and the second contact may include a metal.

The first contact and the second contact may have a ring shape when viewed from a plan view, and one of the first contact and the second contact formed on an outer side of the ring resonator may include an opening on a portion thereof facing the waveguide. The polymer layer may fill a trench between the first contact and the second contact and exposing the ridge unit. The trench may have a ring shape when viewed from a plan view. The trench may have a width greater than a width of the ridge unit. The ridge unit may include the p doping region and the n doping region. The waveguide and the ring resonator may include single crystal silicon.

According to example embodiments, a method of manufacturing an athermal optical modulator includes forming a waveguide and a ring resonator by etching an upper silicon layer of a silicon-on-insulation (SOI) substrate, wherein forming the ring resonator includes sequentially stacking a p+ doping region doped with a higher concentration of p type impurity, a p doping region doped with a lower concentration of p type impurity, an n doping region doped with a lower concentration of n type impurity, and an n+ doping region doped with a higher concentration of n type impurity on an insulating layer, forming a protection layer on the ring resonator, forming a first contact and a second contact by forming vias in the protection layer exposing the p+ doping region and the n+ doping region and filling a metal in the vias, etching the protection layer to form a trench exposing the p+ doping region and the n+ doping region between the first contact and the second contact, and forming a polymer layer filling the trench.

Each of the first contact and the second contact may have a ring shape when viewed from a plan view, and one of the first contact and the second contact on an outer side of the polymer layer may include an opening on a portion thereof facing the waveguide. The protection layer may be etched to form the trench having a ring shape when viewed from a plan view. The protection layer may be etched to form the trench having a width greater than a width of the ridge unit.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
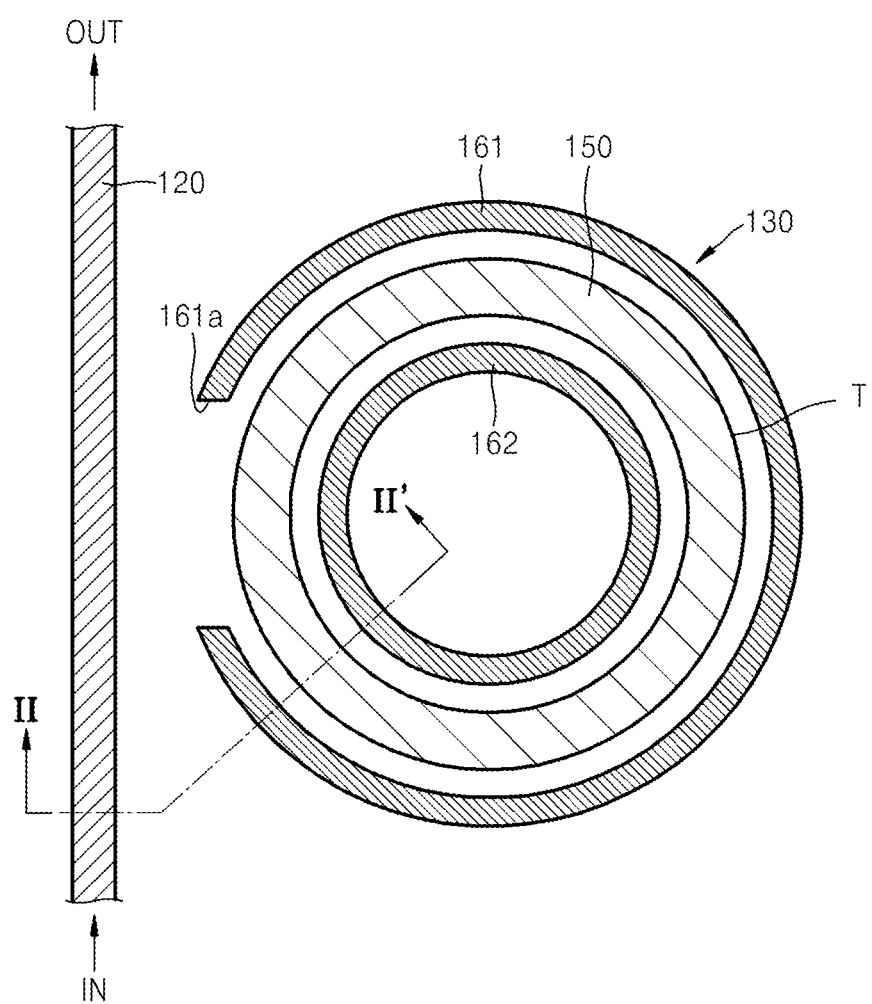
FIG. 1 is a schematic plan view of a structure of an athermal optical modulator according to example embodiments.

Hereafter, example embodiments will be described more fully with reference to the accompanying drawings. In the drawings, thicknesses of layers and regions may be exaggerated for clarity of the specification. The embodiments described below are only examples, and thus, it should be understood that various changes may be made from the example embodiments set forth herein. When an element is referred to as being "on" or "above" another element, it may include an element directly on the element and elements that are not in contact with the element. In the drawings, like reference numerals are used for elements that are substantially identical to each other, and the descriptions thereof will not be repeated.

It will be understood that, although the terms first, second, third etc. may be used herein to describe various elements, these elements should not be limited by these terms. These terms are used to distinguish one element from another. Thus, a first element discussed below could be termed a second element without departing from the teachings of example embodiments. As used herein, the term "and/or" includes any and all combinations of one or more of the associated listed items.

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
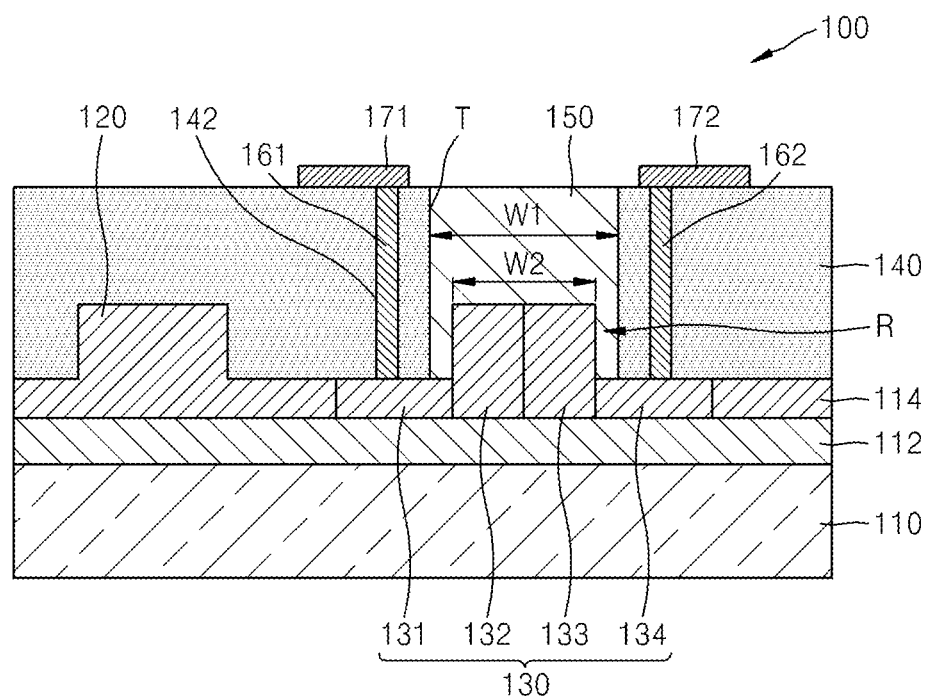
FIG. 2 is a cross-sectional view taken along the line II-II' of FIG. 1.

FIG. 1 is a schematic plan view of a structure of an athermal optical modulator 100 according to example embodiments. FIG. 2 is a cross-sectional view taken along the line II-II' of FIG. 1.

Referring to FIGS. 1 and 2, an insulating layer 112 may be formed on a substrate 110, and a waveguide 120 and a ring resonator 130 may be formed on the insulating layer 112. The waveguide 120 and the ring resonator 130 may be formed of single crystal silicon. The waveguide 120 and the ring resonator 130 may be formed in an upper silicon layer 114 of a silicon-on-insulation (SOI) substrate. The ring resonator 130 may have a circular ring shape. Also, the ring resonator 130 may have various annular shapes including a ring shape and an oval shaped ring.

The ring resonator 130 includes a p+ doping region 131 doped with a relatively high concentration of p type impurity, a p doping region 132 doped with a relatively low concentration of p type impurity, an n doping region 133 doped with a relatively low concentration of n type impurity, and an n+ doping region 134 doped with a relatively high concentration of n type impurity sequentially formed in the stated order from the outer side of the ring resonator 130. However, the configuration of the ring resonator 130 is not limited thereto, for example, the ring resonator 130 may include the n+ doping region doped with a relatively high concentration, an n doping region doped with a relatively low concentration, a p doping region doped with a relatively low concentration, and a p+ doping region 131 doped with a relatively high concentration sequentially formed in the stated order from the outer side of the ring resonator 130.

The p+ doping region 131 and the n+ doping region 134 may be regions respectively doped with an impurity at a concentration of $10^{18}$~$10^{19}$/cm$^3$, and the p doping region 132 and the n doping region 133 may be regions respectively doped with an impurity at a concentration of $10^{15}$~$10^{17}$/cm$^3$.

In the ring resonator 130, the n doping region 133 and the p doping region 132, which are formed in the center and may be consecutively formed, constitute a ridge unit R that protrudes higher than the p+ doping region 131 and the n+ doping region 134. In the ring resonator 130, light moves mainly through the ridge unit R. The ring resonator 130 may have a diameter in a range from about 1 μm to about 50 μm. The ridge unit R may have a height in a range from about 90 nm to about 150 nm. The height of the ridge unit R may be substantially the same as that of the waveguide 120. The ridge unit R may have a cross-section width in a range from about 200 nm to about 1,000 nm. A width between the waveguide 120 and the ridge unit R may be in a range from about 200 nm to about 1,000 nm.

The waveguide 120 and the ring resonator 130 may be covered by a protection layer 140 on the insulating layer 112. The protection layer 140 may be formed of silicon oxide or silicon nitride. The protection layer 140 may function as a cladding layer of a light propagation path together with the insulating layer 112.

A first contact 161 may be formed to contact the p+ doping region 131 of the ring resonator 130, and a second contact 162 may be formed to contact the n+ doping region 134 of the ring resonator 130. Via holes 142 may be formed in the protection layer 140 to expose the p+ doping region 131 and the n+ doping region 134. Each of the via holes 142 may be filled with a via metal. The via metals may be the first contact 161 and the second contact 162. As shown in FIG. 1, the first contact 161 and the second contact 162 may have the shape of the ring resonator 130. When the first contact 161 has a ring shape, as shown in FIG. 1, an opening 161a may be formed in a region of the first contact 161 adjacent to the waveguide 120. The opening 161a may be formed to prevent or inhibit interferences in light propagation between the waveguide 120 and the ring resonator 130 by the first contact 161.

A trench T may be formed between the first contact 161 and the second contact 162 on the upper silicon layer 114. The trench T may be formed to include the ridge unit R. The trench T may have a width W1 greater than the width W2 of the ridge unit R. The trench T may be formed to have the same shape as the ring resonator 130.

The trench T may be filled with a polymer. A polymer layer 150 that is formed by filling a polymer may be formed of, for example, poly (methyl methacrylate) (PMMA). The polymer layer 150 may be formed to have a thickness in a range from about 100 nm to about 5 μm. In FIG. 2, an upper surface of the polymer layer 150 may be exposed, but the present disclosure is not limited thereto. For example, the protection layer 140 may extend on the polymer layer 150. A detailed structure will be described below with reference to FIG. 3D.

A first electrode pad 171 and a second electrode pad 172 respectively connected to the first contact 161 and the second contact 162 may be formed on the protection layer 140.

Light that enters the waveguide 120 passes through the waveguide 120 and is transmitted to the ring resonator 130 through the opening 161a. After circulating in the ring resonator 130, the light is re-transmitted to the waveguide 120 through the opening 161a, and afterwards, is output. At this point, when a predetermined or given voltage is applied to the ring resonator 130 through the first and second electrode pads 171 and 172, a frequency of the light propagated to the waveguide 120 through the ring resonator 130 is modulated. When detecting light output from the waveguide 120, an optical signal is determined according to the detected frequency.

The refractive index of silicon varies as the temperature increases. Accordingly, a wavelength of propagation light may vary due to a relatively high thermo-optic coefficient of silicon, and as a result, desired optical signals may not be transmitted. However, the polymer layer 150 has a thermo-optic coefficient lower than that of silicon. The athermal optical modulator 100 that includes the polymer layer 150 may have a wavelength change with respect to temperature of 0.5 pm/K. Accordingly, the athermal optical modulator 100 may stably transmit almost uniform optical signals.

Also, because the first contact 161 and the second contact 162 are formed to have the same shape as the ring resonator 130, a power input from the first and second electrode pads 171 and 172 is stably supplied to the ring resonator 130, and forms a uniform electric field in the ring resonator 130, and thus, the athermal optical modulator 100 may generate stable optical signals.

FIGS. 3A through 3D are cross-sectional views showing a method of manufacturing an athermal optical modulator 200 according to example embodiments.

Figure 3A:
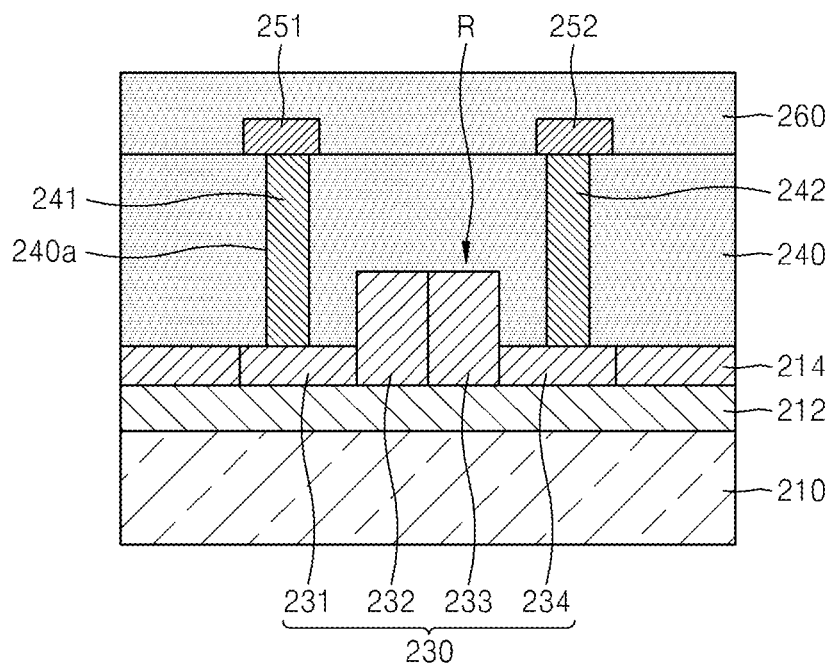
FIGS. 3A through 3D are cross-sectional views showing a method of manufacturing an athermal optical modulator according to example embodiments.

Referring to FIG. 3A, a SOI substrate is prepared. The SOI substrate includes a silicon substrate 210 and an insulating layer 212 and an upper silicon layer 214 which are sequentially formed on the silicon substrate 210. As depicted in FIGS. 1 and 3A, a waveguide (refer to 120 of FIG. 1) and a ring resonator 230 may be formed by patterning the upper silicon layer 214. In FIGS. 3A through 3D, the waveguide is omitted for convenience of explanation.

The ring resonator 230 includes a protruded ridge unit R. A p+ doping region 231 doped with a relatively high concentration, a p doping region 232 doped with a relatively low concentration, an n doping region 233 doped with a relatively low concentration of n, and an n+ doping region 234 doped with a relatively high concentration may be sequentially formed in the stated order from an outer side of the ring resonator 230 by sequentially doping them using an implant process well known in the semiconductor process. The p doping region 232 and the n doping region 233 correspond to the ridge unit R. For convenience, it is depicted that the p+ doping region 231 is formed on an outer side of the ring resonator 230 facing the waveguide (not shown).

The p+ doping region 231 and the n+ doping region 234 may be regions respectively doped with an impurity at a concentration of $10^{18}$~$10^{19}$/cm$^3$, and the p doping region 232 and the n doping region 233 may be regions respectively doped with an impurity at a concentration of $10^{15}$~$10^{17}$/cm$^3$.

A first protection layer 240 may be formed on the upper silicon layer 214. The first protection layer 240 may be formed of silicon oxide or silicon nitride. Vias 240a that respectively expose the p+ doping region 231 and the n+ doping region 234 from an upper surface of the first protection layer 240 may be formed in the first protection layer 240, and a first contact 241 and the second contact 242 may be formed by filling the vias 240a with a metal. The first and second contacts 241 and 242 may be formed in a ring shape, and the first contact 241 may be formed on an outer region of the ridge unit R and the second contact 242 may be formed on an inner region of the ridge unit R.

An opening (refer to 161a of FIG. 1) for an optical path may be formed in a portion of the first contact 241 that faces the waveguide (refer to 120 of FIG. 1). The opening may be well understood from the opening 161a in FIG. 1, and thus, a detailed description thereof will not be repeated.

After coating an electrode layer (not shown) on the first protection layer 240, first and second electrode pads 251 and 252 that are respectively connected to the first and second contacts 241 and 242 may be formed by patterning the electrode layer.

A second protection layer 260 that covers the first and second electrode pads 251 and 252 may be formed on the first protection layer 240. The second protection layer 260 may be formed by using the same material used to form the first protection layer 240. The second protection layer 260 may prevent or inhibit a polymer from contacting the first and second electrode pads 251 and 252 in a polymer forming process that will be described below.

Figure 3B:
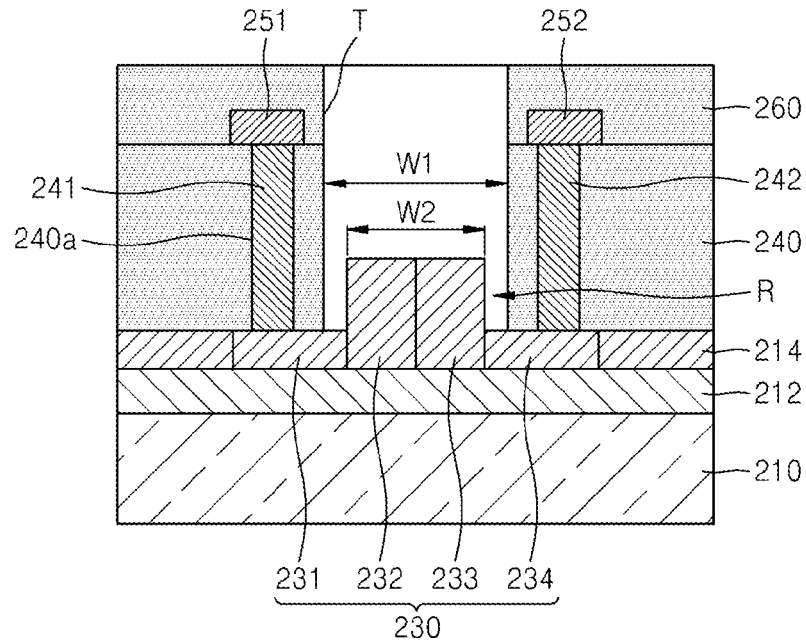

Referring to FIG. 3B, a trench T that exposes the ridge unit R may be formed between the first and second contacts 241 and 242. The trench T may have a width W1 greater than the width W2 of the ridge unit R.

Figure 3C:
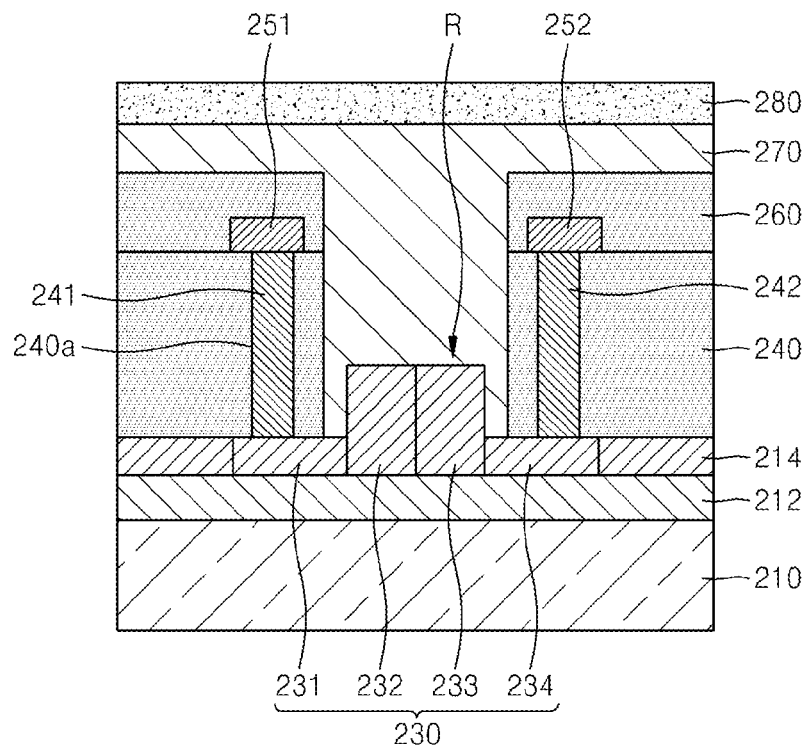

Referring to FIG. 3C, the trench T may be filled with a polymer by using a spin coating method. The resultant product may be referred to as a polymer layer 270. The polymer may be poly (methyl methacrylate) (PMMA). The polymer that fills the trench T may also be formed to cover the second protection layer 260.

A mask layer 280 may be formed on the polymer layer 270. The mask layer 280 may be formed to have a thickness in a range from about 100 nm to about 1 µm. The mask layer 280 may be formed of silicon oxide or silicon nitride.

Figure 3D:
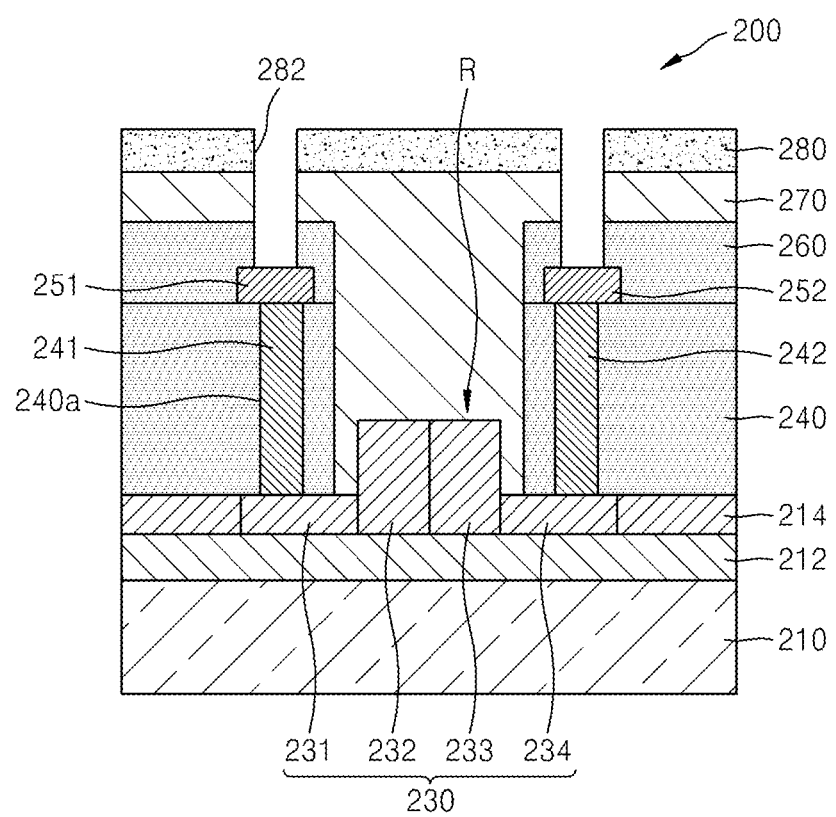

Referring to FIG. 3D, holes 282 may be formed above the first and second electrode pads 251 and 252 by patterning the mask layer 280. The first and second electrode pads 251 and 252 may be exposed by sequentially etching the polymer layer 270 and the second protection layer 260 that are exposed by the holes 282. The second protection layer 260 and the mask layer 280 may be etched by using a dry etching method or wet etching method. The polymer layer 270 may be etched by using an oxygen plasma etching method.

According to example embodiments, a polymer layer may be formed after performing an electrode formation process, which is a relatively high temperature process. Thus, contamination of a device with a melted polymer of the polymer layer in the relatively high temperature electrode formation process may be prevented or inhibited.

Also, because a mask layer is formed on the polymer layer, an integration process with other devices may be possible on a silicon substrate.

In the athermal optical modulator according to example embodiments, a polymer having an athermal characteristic surrounds a ridge unit, and light output from the athermal optical modulator has relatively a stable wavelength.

Also, because first and second contacts are formed as a ring shape of a ring resonator and face each other with the ridge unit therebetween, an electric field of the ring resonator is more rapidly formed and relatively stable, and as a result, output light has a uniform wavelength.

Also, because a polymer layer is formed in a trench after performing an electrode formation process, which is a relatively high temperature process, contamination of a device with a melted polymer of the polymer layer during the relatively high temperature electrode formation process may be prevented or inhibited.

It should be understood that example embodiments described therein should be considered in a descriptive sense only and not for purposes of limitation. It will be understood by those of skilled in the art that various changes in form and details may be made therein without departing from the spirit and scope of the appended claims.

What is claimed is:

1. An athermal optical modulator comprising:
   a waveguide;
   a ring resonator configured to receive light input from the waveguide and output modulated light to the waveguide, the ring resonator including doping regions sequentially stacked in a horizontal direction on an insulating layer, the doping regions including,
      a p+ doping region doped with a higher concentration of p type impurity,
      a p doping region doped with a lower concentration of p type impurity,
      an n doping region doped with a lower concentration of n type impurity, and
      an n+ doping region doped with a higher concentration of n type impurity, wherein the p doping region and the n doping region constitute a ridge unit located at a center of the ring resonator in a vertical section;
   a first contact connected to the p+ doping region located on one side of the ridge unit and a second contact connected to the n+ doping region located on the other side of the ridge unit, the first contact and the second contact forming paths for applying electricity to the ring resonator to form an electric field in the ring resonator;
   a polymer layer covering the ridge unit; and
   a protection layer covering the ring resonator on the insulating layer,
   wherein the first contact and the second contact fill vias in the protection layer that expose the p+ doping region and the n+ doping region, and
   wherein the first contact and the second contact include a metal.

2. The athermal optical modulator of claim 1, wherein the first contact and the second contact have a ring shape when viewed from a plan view, and
   one of the first contact and the second contact formed on an outer side of the ring resonator includes an opening on a portion thereof facing the waveguide.

3. The athermal optical modulator of claim 2, wherein the polymer layer fills a trench between the first contact and the second contact, the trench exposing the ridge unit.

4. The athermal optical modulator of claim 3, wherein the trench has a ring shape when viewed from a plan view.

5. The athermal optical modulator of claim 3, wherein the trench has a width greater than a width of the ridge unit.

6. The athermal optical modulator of claim 1, wherein the waveguide and the ring resonator include single crystal silicon.

7. The athermal optical modulator of claim 1, wherein the polymer layer includes poly (methyl methacrylate) (PMMA).

8. The athermal optical modulator of claim 1, wherein the polymer layer does not contact the first and second contacts.

9. The athermal optical modulator of claim 1, wherein the first contact is between the ridge unit and the waveguide.

10. A method of manufacturing an athermal optical modulator, the method comprising:
    forming a waveguide and a ring resonator by etching an upper silicon layer of a silicon-on-insulation (SOI) substrate, the forming a ring resonator including,
       sequentially stacking a p+ doping region doped with a higher concentration of p type impurity, a p doping region doped with a lower concentration of p type impurity, an n doping region doped with a lower concentration of n type impurity, and an n+ doping region doped with a higher concentration of n type impurity on an insulating layer in a horizontal direction;
    forming a protection layer on the ring resonator;
    forming a first contact and a second contact by forming vias in the protection layer exposing the p+ doping region and the n+ doping region and filling a metal in the vias;
    etching the protection layer to form a trench exposing the p+ doping region and the n+ doping region between the first contact and the second contact; and
    forming a polymer layer filling the trench.

11. The method of claim 10, wherein the forming a first contact and a second contact forms each of the first contact and the second contact having a ring shape when viewed from a plan view, and forms one of the first contact and the second contact on an outer side of the polymer layer including an opening on a portion thereof facing the waveguide.

12. The method of claim 10, wherein the etching etches the protection layer to form the trench having a ring shape when viewed from a plan view.

13. The method of claim 10, wherein the etching etches the protection layer to form the trench having a width greater than a width of the ridge unit.

14. The method of claim 10, wherein the forming a polymer layer forms the polymer layer including poly (methyl methacrylate) (PMMA).

15. The method of claim 10, wherein the forming a polymer layer forms the polymer layer not contacting the first and second contacts.

16. The method of claim 10, wherein the forming a first contact forms the first contact between the n and p doping regions and the waveguide.

* * * * *